(12) United States Patent
Fujimura

(10) Patent No.: US 8,308,328 B2
(45) Date of Patent: Nov. 13, 2012

(54) ELECTRONIC DEVICE AND METHOD FOR ATTACHING LIGHT GUIDE LENS

(75) Inventor: Nobuhiko Fujimura, Tokyo (JP)

(73) Assignee: TEAC Corporation, Tama-shi, Tokyo (JP)

( * ) Notice: Subject to any disclaimer, the term of this patent is extended or adjusted under 35 U.S.C. 154(b) by 85 days.

(21) Appl. No.: 13/070,152

(22) Filed: Mar. 23, 2011

(65) Prior Publication Data

US 2012/0163011 A1 Jun. 28, 2012

(30) Foreign Application Priority Data

Dec. 27, 2010 (JP) ................... 2010-289595

(51) Int. Cl.
*F21V 7/04* (2006.01)

(52) U.S. Cl. ........ 362/551; 362/555; 362/581; 362/559; 362/582; 362/26; 40/547

(58) Field of Classification Search ............... 362/555, 362/559, 581, 582, 576, 800, 26; 40/547
See application file for complete search history.

(56) References Cited

U.S. PATENT DOCUMENTS

| | | | | |
|---|---|---|---|---|
| 5,268,823 A | * | 12/1993 | Yergenson | 362/555 |
| 5,982,969 A | * | 11/1999 | Sugiyama et al. | 385/123 |
| 6,499,191 B1 | * | 12/2002 | Howie, Jr. | 16/441 |
| 2005/0068189 A9 | | 3/2005 | Nishizawa | |

FOREIGN PATENT DOCUMENTS

| | | |
|---|---|---|
| JP | 2004111568 A | 4/2004 |
| JP | 2008152844 A | 7/2008 |

* cited by examiner

*Primary Examiner* — Ali Alavi
(74) *Attorney, Agent, or Firm* — Seed IP Law Group PLLC

(57) ABSTRACT

An electronic device includes a design panel 12 made of a resin and a light guide lens 16 that is attached to the design panel 12 so as to guide light from a light source to the outside. An insert hole 20 that is a through hole whose shape is commensurate with the light guide lens 16 is formed in the design panel 12. The light guide lens 16 is inserted into the insert hole 20 by elastically deforming a rim of the insert hole 20 when the light guide lens 16 is pushed into the insert hole 20, to thus be attached to the design panel 12. Auxiliary grooves 22 that promote elastic deformation are formed in a neighborhood of the rim of the insert hole 20.

7 Claims, 12 Drawing Sheets

ENLARGED AREA A

BACK SIDE

FRONT SIDE

ENLARGED AREA D

ENLARGED AREA H

ELECTRONIC DEVICE AND METHOD FOR ATTACHING LIGHT GUIDE LENS

This application claims priority to Japanese Patent Application No. 2010-289595, filed on Dec. 27, 2010, which is incorporated herein by reference in its entirety.

TECHNICAL FIELD

The present invention relates to an electronic device equipped with an indicator as well as to a method for attaching a light guide lens constituting the indicator to a design panel.

BACKGROUND ART

A hitherto widely known electronic device is equipped with an indicator that displays a status of the electronic device (e.g., activation/deactivation of the power) to a user by means of a lighting condition. Many of the indicators are equipped with a lightguide lens that guides light from a light source to the outside. The light guide lens is usually fitted into an insert hole opened in a design panel.

If the thus-attached light guide lens remains simply inserted into the insert hole, the lens will often detach itself from the insert hole. According to JP 2008-152844 A, after a light guide lens has been inserted into an insert hole, the light guide lens is welded to a design panel in order to prevent detachment of the lens from the insert hole. More specifically, according to JP 2008-152844 A, attachment holes into which bosses projecting out of a back surface of the design panel are to be inserted are formed in corner portions of the light guide lens (portions that do not act as a lens). Leading ends of the bosses projecting out of the attachment holes are melted by means of a soldering iron, thereby attaching the light guide lens to the design panel.

A technique disclosed in JP 2004-111568 A includes press-fitting a light guide lens made of a soft optical transparent element into an insert hole of a design panel, to thus secure a circumferential side surface of the light guide lens to an inner peripheral wall surface of the insert hole through pressure welding.

According to the technique for welding the light guide lens, such as that described in connection with JP 2008-152844 A, detachment of the light guide lens is prevented without fail. However, the technique requires a welding facility and encounters a problem of the inability to easily attach the light guide lens. Further, since a once-welded light guide lens cannot be removed, difficulty is encountered in disassembling and recycling the light guide lens.

According to the technique described in connection with JP 2004-111568 A, a light guide lens made of a soft light transparent material is used, and hence the lens can also be attached and detached with relative ease. However, since a special material, like a soft light transparent material, is utilized, there has been a problem of a tendency toward higher component costs.

SUMMARY

Accordingly, the present invention aims at providing an electronic device that enables simpler, lower cost attachment of a light guide lens and an attachment method.

The present invention provides an electronic device with an indicator comprising: a design panel made of a resin; and a light guide lens that guides to the outside light from a light source disposed in the indicator and that is to be attached to the design panel, wherein an insert hole that is a through hole whose shape is commensurate with the light guide lens is formed in the design panel; and wherein the light guide lens is inserted into the insert hole as a result of a rim of the insert hole being elastically deformed when the light guide lens is pushed into the insert hole, to thus be attached to the design panel.

In a preferred mode, grooves or through holes that promote elastic deformation are formed along sides of the insert hole and in a neighborhood of the rim of the insert hole on the back surface of the design panel.

In another preferred mode, the insert hole is made in such a way that an opening width of the insert hole measured on a back surface side is smaller than an opening width of the insert hole measured on a front surface side, and the light guide lens has a cross-sectional profile portion that is commensurate with a cross-sectional profile of the insert hole and is press-fitted into the insert hole from the front surface side. In this case, turned portions that bulge outside and that are engaged with the back surface are preferably provided on respective portions of the light guide lens that protrude from the back surface of the design panel when the light guide lens is pushed until a front surface of the light guide lens becomes substantially flush with a front surface of the design panel.

In yet another preferred mode, the electronic device further comprises a projecting member that protrudes from the rim on the back surface side of the insert hole, that allows entry of the light guide lens from the back surface side, and opposes in close proximity to the back surface of the light guide lens entered from the back surface side, thereby preventing detachment of the light guide lens. In this case, the light guide lens preferably has a lens and thin flanges that extend from the rim of the back surface of the lens to the outside, and indentations for accommodating the respective flanges are preferably formed along the rim of the insert hole on the back side of the design panel.

Another present invention also provides a lens attachment method for attaching to a design panel of an electronic device a light guide lens that guides light from a light source provided in an indicator to the outside, the method comprising: forming, in the design panel made of a resin, an insert hole whose shape is commensurate with the light guide lens and inserting the light guide lens into the insert hole by elastically deforming a rim of the insert hole when the light guide lens is pushed into the insert hole, thereby attaching the light guide lens to the design panel.

According to the present invention, the light guide lens is attached to the insert hole by elastically deforming the rim of the insert hole. Therefore, the light guide lens can be attached more easily and at lower cost.

The inventions will be more clearly comprehended by reference to the embodiments provided below. However, the scope of the inventions is not limited to the embodiments.

BRIEF DESCRIPTION OF THE DRAWINGS

Preferred embodiments of the present invention will be described in detail by reference to the following drawings, wherein.

DESCRIPTION OF EMBODIMENTS

Figure 1:
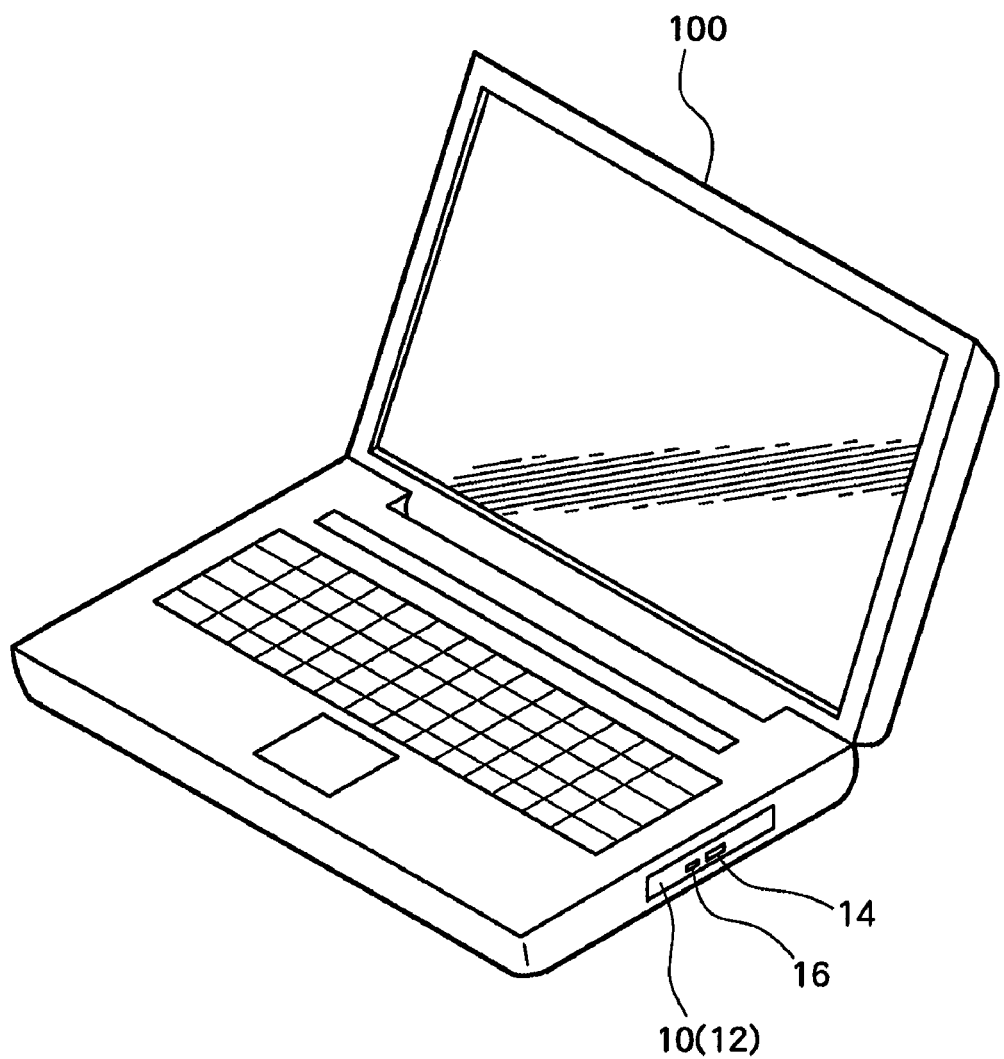
FIG. 1 is a schematic perspective view of a PC with an integrated optical disc drive that is an embodiment of the present invention.

Embodiments of the present invention are hereunder described by reference to the drawings. FIG. 1 is a schematic perspective view of a personal computer (hereinafter abbreviated as a "PC") 100 with a built-in optical disc drive 10 that is an embodiment of the present invention. In a state of being incorporated in the PC 100, the optical disc drive 10, for the most part, is housed in the PC 100. Only a design panel 12 situated on the front of the optical disc drive 10 is exposed outside. The design panel 12 is equipped with an actuation button 14 that accepts a user's operating instruction, a light guide lens 16 that is a constituent element of an indicator, and others.

The indicator is for informing the user of a driving status of the optical disc drive 10 and includes a light source (not shown) provided in an electronic device and the light guide lens 16 for guiding light originating from the light source to the outside. The light source is lighted or extinguished in accordance with the driving status of the optical disc drive 10, thereby informing the user of the driving status of the optical disc drive 10.

The light guide lens 16 making up such an indicator is usually inserted into an insert hole made in the design panel 12, to thus be attached to the design panel 12. However, when the light guide lens 16 is merely inserted into the insert hole, the light guide lens 16 may detach itself from the insert hole 20.

In the related art, in order to prevent detachment of the light guide lens, the light guide lens 16 is in part welded to the design panel 12 or formed from a soft material (an elastic material). However, such a related art technique requires complicated attachment steps or encounters a problem of the inability to disassemble or detach the once-attached light guide lens 16 or a problem of an increase in component costs. In order to resolve the problems, the present embodiment adopts a special structure for attaching the light guide lens 16. The special structure is hereunder described in detail.

Figure 2:
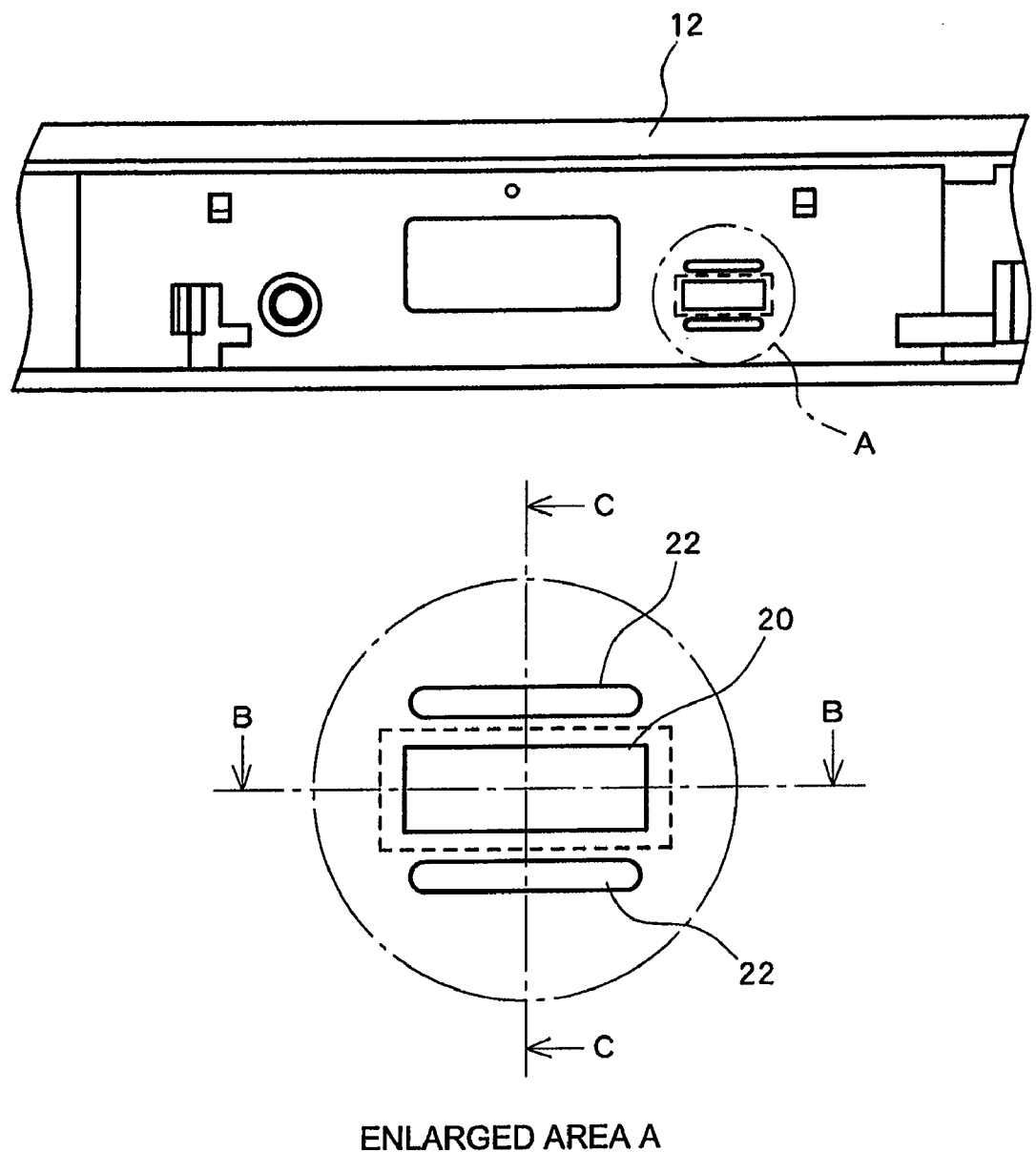
FIG. 2 is a rear view of a design panel.
Figure 3A:
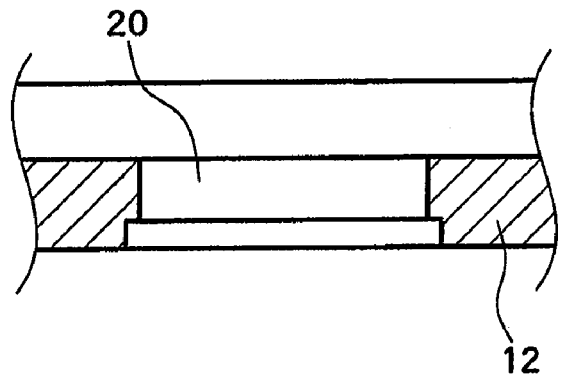
FIG. 3A is a cross-sectional view taken along line B-B shown in FIG. 2.
Figure 3B:
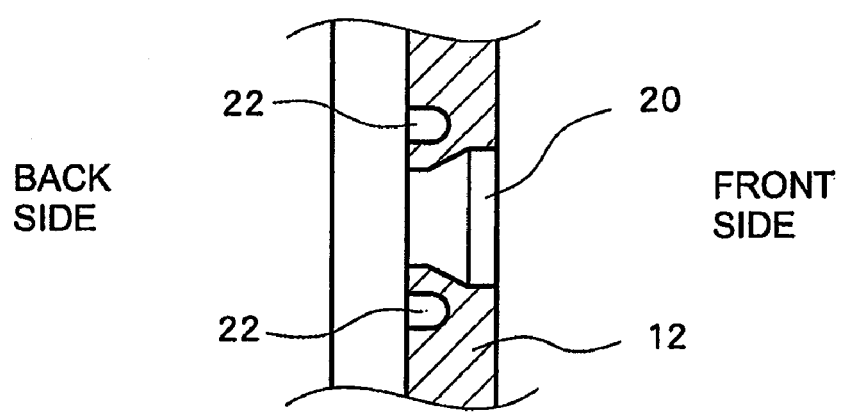
FIG. 3B is a cross-sectional view taken along line C-C shown in FIG. 2.

First, the design panel 12 to which the light guide lens 16 is attached is described in detail. FIG. 2 is a rear view of the design panel 12. FIG. 3A is a cross-sectional view taken along line B-B shown in FIG. 2, and FIG. 3B is a cross-sectional view taken along line C-C shown in FIG. 2.

The design panel 12 is a panel to be attached to a surface of the electronic device that is to become exposed outside. A variety of actuation buttons, a display member, and the like, are attached to the panel. In the present embodiment, the light guide lens 16 that is a constituent element of the indicator is attached to the design panel 12.

The design panel 12 is made of an elastic material, like a resin. The insert hole 20 into which the light guide lens 16 is to be inserted is formed at a location on the design panel 12 to which the light guide lens 16 is to be attached. The insert hole 20 assumes a shape commensurate with the light guide lens 16 to be described later in detail. The insert hole 20 specifically assumes a horizontally long, substantially oblong shape when viewed from the front. In order to prevent detachment of the light guide lens 16, the insert hole assumes a cross-sectional profile such that an opening width of a back side becomes smaller than a width of an opening of a front side.

Specifically, as shown in FIG. 3A, the insert hole 20 of the present embodiment assumes a substantially T-shaped lateral cross-sectional profile. A step where an opening width of the insert hole measured along its major axis becomes smaller is provided along a path going from a front side to a back side. Put another way, a stepped surface is provided on a side surface of the insert hole 20 along its major axis. As shown in FIG. 3B, the insert hole 20 of the present embodiment assumes a substantially-horn-shaped longitudinal cross-sectional profile that becomes wider with an increasing distance toward the front side, wherein an opening width of the insert hole measured along its minor axis becomes gradually smaller along the path going from the front side to the back side. A tapered surface, in other words, is provided on the side surface of the insert hole 20 along its minor axis. The opening width of the back surface is made smaller than the opening width of the front surface as mentioned above, thereby preventing the light guide lens 16 press fitted from the front side from detaching itself from the back side. In the present embodiment, both the opening width measured along the minor axis and the opening width measured along the major axis, which are acquired on the back side, are made smaller than those acquired on the front side. As a matter of course, however, either the opening width measured along the minor axis or the opening width measured along the major axis, which is acquired on the back side, may also be made smaller than its counterpart opening width acquired on the front side. Alternatively, a step can also be provided on the side surface of the hole along its minor axis, and a tapered surface can also be provided on the side surface of the hole along its major axis. Still alternatively, a tapered surface can be provided on both the side surface extending along the minor axis and the side surface extending along the major axis.

Auxiliary grooves 22 are provided in a neighborhood of sides (long sides) of the insert hole 20 along its major axis on a back surface of the design panel 12. Each of the auxiliary grooves 22 has a depth that is about one-half a thickness of the design panel 12, to thus be invisible from the front side.

The auxiliary grooves 22 are provided in order to promote elastic deformation of the insert hole 20 when the light guide lens 16 is inserted into the insert hole 20. Specifically, the light guide lens 16 is pressed and inserted into the insert hole 20 from the front side. The rim of the insert hole 20 is slightly broadened at this time by means of elastic deformation, whereupon the light guide lens 16 is inserted into the insert hole 20. In order to induce elastic deformation more reliably, the auxiliary grooves 22 extending along long sides are provided in the neighborhoods of the long sides of the insert hole 20. Since the auxiliary grooves 22 are provided, the neighborhoods of the long sides becomes thinner, so that rigidity of the insert hole achieved along its minor axis is significantly reduced. As a consequence, the neighborhoods of the long sides of the insert hole 20 become easy to be elastically deformed, whereby it becomes possible to press-fit the light guide lens 16 into the insert hole 20 more reliably and easily. Since the auxiliary grooves 22 do not penetrate through the design panel 12, a reduction in rigidity of the surface of the design panel is prevented.

Figure 4A:
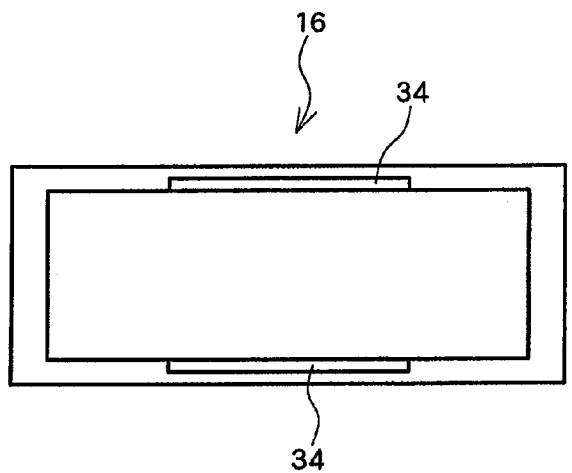
FIG. 4A is a rear view of a light guide lens.
Figure 4C:
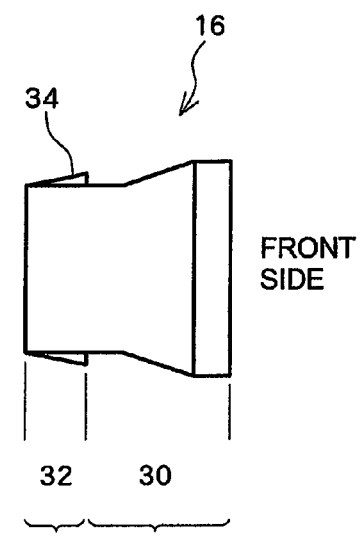
FIG. 4C is a drawing of the light guide lens viewed along its major axis.
Figure 4B:
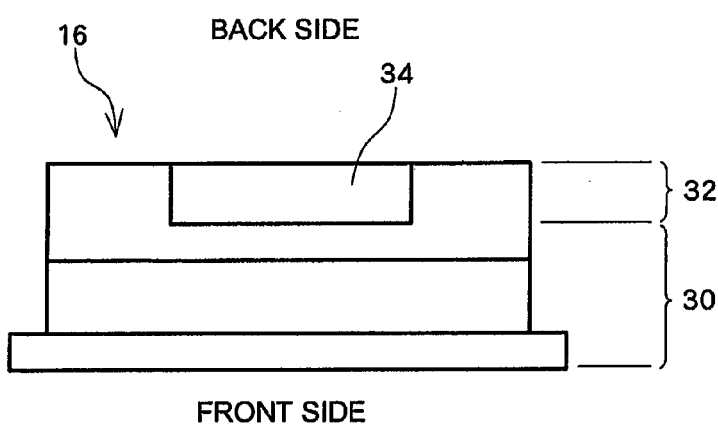
FIG. 4B is a drawing of the light guide lens viewed along its a minor axis.

The light guide lens 16 is now described by reference to FIGS. 4A to 4C. FIG. 4A is a rear view of the light guide lens 16; FIG. 4B is a drawing of the light guide lens 16 viewed along its minor axis; and FIG. 4C is a drawing of the light guide lens 16 viewed along its major axis.

The light guide lens 16 is for guiding light from the light source to the outside and made of a translucent hard material; for instance, glass and transparent plastic. The light guide lens 16 assumes a horizontally long, substantially oblong shape when viewed from the front in the same manner as does the insert hole 20. In the meantime, a thickness of the light guide lens 16 is greater than a depth of the insert hole 20 (i.e., the thickness of the design panel 12). Therefore, when assembly is completed by inserting the light guide lens 16 into the insert hole 20, to thus bring the front surface of the light guide lens 16 substantially in flush with the front surface of the design panel 12, a rear end portion of the light guide lens 16 protrudes from the back surface of the design panel 12. A portion of the light guide lens 16 that is accommodated in the insert hole 20 at the time of completion of assembly is hereunder called an "accommodated portion 30," and another portion of the light guide lens protruding from the back surface of the design panel 12 is hereunder called a "protruding portion 32."

The accommodated portion 30 assumes a shape commensurate with the insert hole 20. Specifically, the accommodated portion 30 assumes a substantially-T-shaped lateral cross-sectional profile and has, along a path going from the front side to the back side, a step where a width of the accommodated portion measured along its major axis becomes smaller. The accommodated portion 30 assumes a substantially-horn-shaped longitudinal cross-sectional profile and a tapered portion in which a width of the accommodated portion measured along its minor axis becomes gradually smaller along the path going from the front side to the back side.

The protruding portion 32 is a substantially rectangular region extending from a rear end of the accommodated portion 30. A turned portion 34 that is engaged with the back side of the design panel 12 after having passed through the insert hole 20, to thus prevent detachment of the light guide lens 16, is provided on either side surface of the protruding portion 32 along its minor axis. Each of the turned portions 34 is a region that gradually bulges outside along the minor axis during the course of going from a rear end of the protruding portion 32 (a back side end portion of the light guide lens 16) toward a front end of the protruding portion 32 (a boundary area between the protruding portion 32 and the accommodated portion 30). By virtue of presence of the turned portions 34, the width of the protruding portion 32 measured along its minor axis gradually increases with a nearer approach from the rear end of the protruding portion 32 to the front end of the same. A width of the rear end of the protruding portion 32 measured along its minor axis is slightly smaller than the width of the insert hole 20 measured along its minor axis. A width of the front end of the protruding portion 32 measured along its minor axis is greater than the width of the insert hole 20 measured along its minor axis. As a consequence, once the protruding portion 32 has passed through the insert hole 20, to thus protrude from the back surface of the design panel 12, the turned portions 34 will come into contact with a rim of the insert hole 20 even if the light guide lens 16 attempts to move (detach itself) to the front side. Detachment of the light guide lens 16 to the front side is thereby prevented.

Figure 5B:
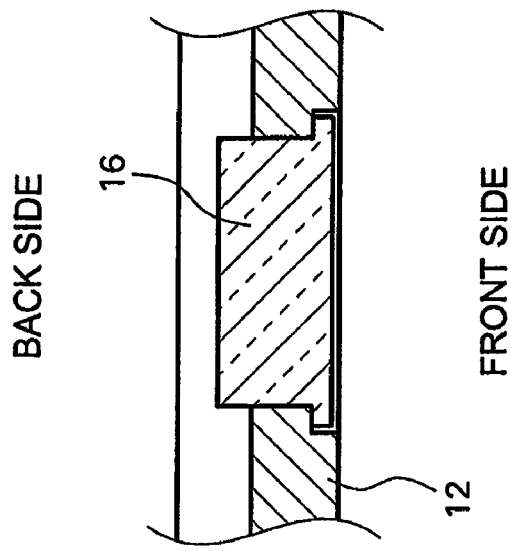
FIG. 5B is a schematic lateral cross-sectional view of the neighborhood of the light guide lens achieved before and after assembly of the lens.
Figure 5A:
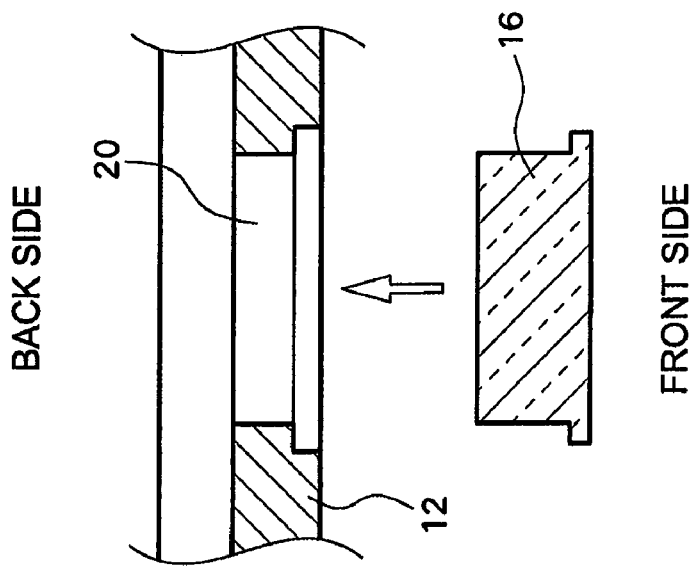
FIG. 5A is a schematic lateral cross-sectional view of a neighborhood of the light guide lens achieved before and after assembly of the lens.
Figure 6A:
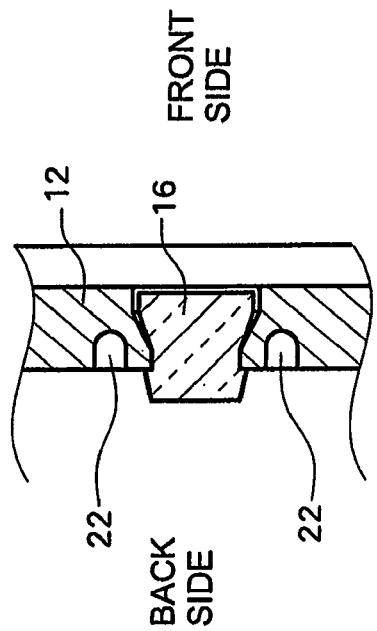
FIG. 6A is a schematic longitudinal cross-sectional view of a neighborhood of the light guide lens achieved before and after assembly of the lens.
Figure 6B:
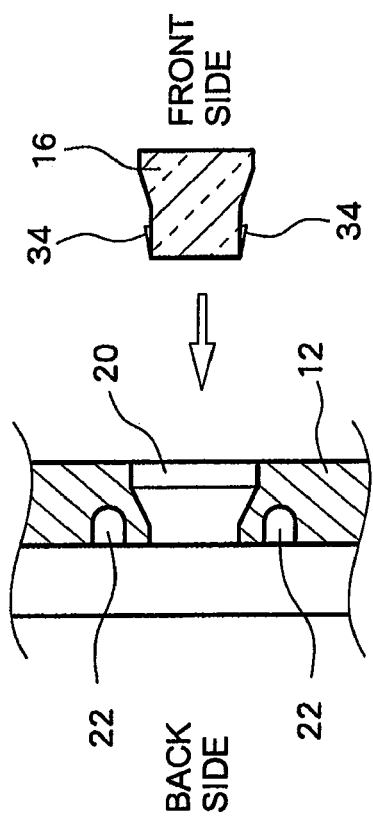
FIG. 6B is a schematic longitudinal cross-sectional view of the neighborhood of the light guide lens achieved before and after assembly of the lens.

Assembly flow for attaching the light guide lens 16 to the design panel 12 is now described by reference to FIGS. 5A, 5B, 6A, and 6B. FIGS. 5A and 5B are schematic lateral cross-sectional views of a neighborhood of the light guide lens 16 achieved before and after assembly of the lens. FIGS. 6A and 6B are schematic longitudinal cross-sectional views of a neighborhood of the light guide lens 16 achieved before and after assembly of the lens.

The light guide lens 16 is inserted into the insert hole 20 from the front side. A width of the rear end of the light guide lens 16 is sufficiently smaller than the width of a front end of the insert hole 20. Therefore, the rear end of the light guide lens 16 can be readily inserted into the insert hole 20. Subsequently, during the course of the light guide lens 16 being pressed against the back side of the insert hole, side surfaces of the turned portions 34 of the light guide lens 16 come into contact with an inner periphery of the insert hole 20. When the light guide lens 16 is further pushed deeply while remaining in contact with the inner periphery, the rim of the insert hole 20 becomes deflected by pushing force, so that the rim of the insert hole 20 becomes elastically deformed to thereby allow passage of the turned portions 34. The auxiliary grooves 22 are formed in the neighborhoods of long sides of the insert hole 20, so as to extend along the long sides. By virtue of presence of the auxiliary grooves 22, a decrease arises in rigidity of the neighborhoods of the rim of the insert hole 20, whereby the neighborhood of the rim becomes liable to deflection. As a consequence, even when the force exerted to push the light guide lens 16 is relatively small, the insert hole 20 can be elastically deformed, so that the turned portions 34 can be easily caused to pass. When the turned portions 34 pass through the insert hole 20 as a result of being pushed, the turned portions 34 come to oppose the neighborhood of the rim of the insert hole 20, thereby regulating movement of the light guide lens 16 to the front side. Detachment of the light guide lens 16 to the front side is thereby prevented effectively. Further, the tapered surface and the stepped surface of the insert hole 20 oppose their corresponding surfaces of the accommodated portion 30 of the light guide lens 16, thereby regulating further movement of the light guide lens to the back side. Consequently, detachment of the light guide lens 16 to the back side is also effectively prevented.

Specifically, according to the present embodiment, detachment of the light guide lens 16 to both the front side and the back side is effectively prevented. In the present embodiment, the light guide lens 16 is attached to the design panel 12 through assembly operation by elastically deforming the rim of the insert hole 20. As a consequence, when compared with the related art technique using welding, or the like, the present invention enables facilitation of assembly operation. Moreover, an expensive soft translucent material does not need to be used as a material for the light guide lens 16, and hence component costs can be curtailed.

Further, the light guide lens 16 is assembled by elastically deforming the rim of the insert hole 20. So long as the rim of the insert hole 20 is again elastically deformed after assembly, the once-attached light guide lens 16 can be detached. Specifically, a narrow plate material, or the like, is inserted into a space between the light guide lens 16 and the rim of the insert hole 20, and the light guide lens 16 is pushed outside while force is exerted in a direction to broaden the insert hole 20, the once-attached light guide lens 16 can also be detached. In such a configuration, when an error has occurred during attachment of the light guide lens 16 or a fault has occurred in another area irrelevant to the light guide lens 16, there is no necessity for wastefully discarding the light guide lens 16, so that manufacturing costs can be curtailed. In this regard, an explanation is provided by reference to, by way of example, a case where the light guide lens 16 is attached by means of an undetachable technique, like a welding technique.

A necessity for discarding the design panel 12 is assumed to have arisen for reasons of erroneous welding of the light guide lens 16 or a fault occurred in an area irrelevant to the light guide lens 16 after the light guide lens 16 has been attached to the design panel 12 by means of welding. When attached by means of welding, the light guide lens 16 cannot be detached from the design panel 12. Therefore, even when no fault exists in the light guide lens 16, the light guide lens must be discarded along with the design panel 12. In the meantime, when the light guide lens 16 is attached by utilization of elastic deformation of the rim of the insert hole 20 as in the present embodiment, erroneous welding of the light guide lens 16 is prevented. Further, when a fault has occurred in a portion of the design panel 12, it becomes possible to remove the light guide lens 16 from the design panel 12 and discard only the design panel 12. The thus-detached light guide lens 16 can be again attached to another design panel 12. Likewise, even when a fault has occurred in the light guide lens 16, the light guide lens 16 can be detached, and only the thus-detached light guide lens 16 can be discarded, whereby the design panel 12 can be recycled. As a consequence, a chance of wasteful discarding of the light guide lens 16 and the design panel 12 can be lessened, so that manufacturing costs can be curtailed further.

A second embodiment of the invention is now described. Unlike the first embodiment, the second embodiment involves inserting the light guide lens 16 into the insert hole 20 not from its front side but from its back side. For this reason, the light guide lens 16 and the design panel 12 are slightly different from their counterparts described in connection with the first embodiment in terms of a shape. The second embodiment is described primarily in connection with the difference.

Figure 7A:
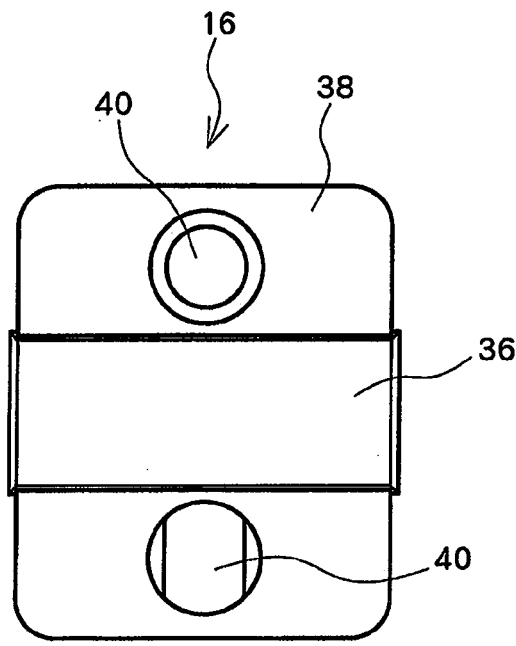
FIG. 7A is a front view of a light guide lens of another embodiment.
Figure 7C:
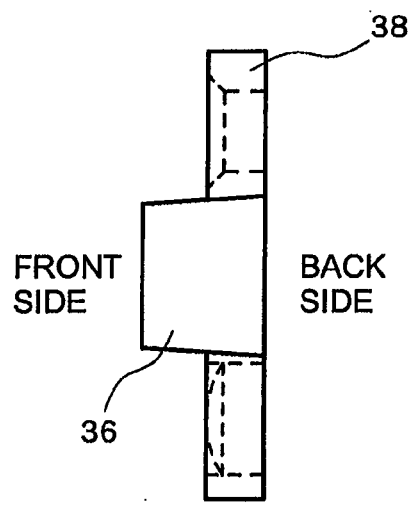
FIG. 7C is a drawing of the light guide lens of the other embodiment viewed along its major axis.
Figure 7B:
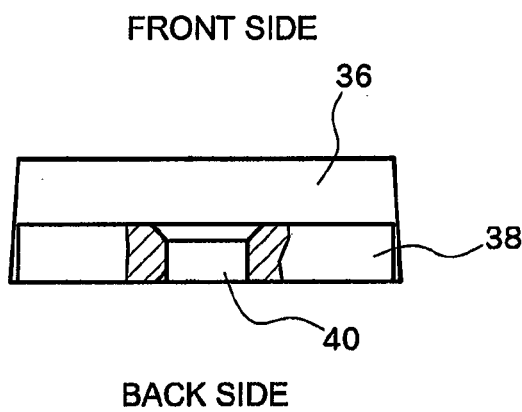
FIG. 7B is a drawing of a light guide lens of another embodiment viewed along its minor axis.

First, the light guide lens 16 used in the second embodiment is described by reference to FIGS. 7A to 7C. FIG. 7A is a front view of the light guide lens 16; FIG. 7B is a drawing of the light guide lens acquired along its minor axis; and FIG. 7C is a drawing of the light guide lens acquired along its major axis.

The light guide lens 16 of the second embodiment is roughly divided into a lens 36 acting as a lens and the flanges 38 bulging outside from the neighborhood of the lens 36. When viewed from the front, the lens 36 assumes a horizontally long, substantially oblong shape. Each of four side surfaces of the lens 36 has a taper directed outside with a nearer approach to the back side, so that the lens becomes smaller with an increasing distance from its back surface to its front surface. When viewed from another aspect, the lens 36 assumes a substantially truncated pyramidal shape such that the oblong shape becomes increasingly smaller in size from its back surface to its front surface.

The flanges 38 protrude outside from each of two long sides of the lens 36. The flanges 38 are substantially rectangular plate-like regions. A back end face of each of the flanges 38 and a back end face (the back side) of the lens 36 are flush with each other. Since a thickness of each of the flanges 38 is about one-half of a thickness of the lens 36 (smaller than the thickness of the design panel 12). Therefore, the flanges 38 do not become exposed during assembly of the lens and come into contact with corresponding indentations 24 formed in the design panel 12.

A positioning hole 40 into which a positioning boss 26 projecting out of each of the indentations 24 of the design panel 12 is to be inserted is formed in each of the two flanges 38. Of the two positioning holes 40, one positioning hole is a round hole that has substantially the same diameter as does the positioning boss 26. As a result of a corresponding positioning boss 26 being inserted into this positioning hole, the position of the light guide lens 16 is set in both the major axis and the minor axis of the lens. The other positioning hole 40 is an elongated hole whose width measured along its minor axis is substantially identical with the diameter of the positioning boss 26. As a result of a corresponding positioning boss 26 being inserted into the positioning hole, the position of the light guide lens 16 is set along its major axis. In the meantime, it also becomes possible to perform fine positional adjustment of the light guide lens along its minor axis (i.e., absorption of an error in the location where the positioning bosses 26 are to be formed). A rear end of each of these two positioning holes 40 has a slightly greater diameter (width), thereby facilitating insertion of the positioning bosses 26.

Figure 8:
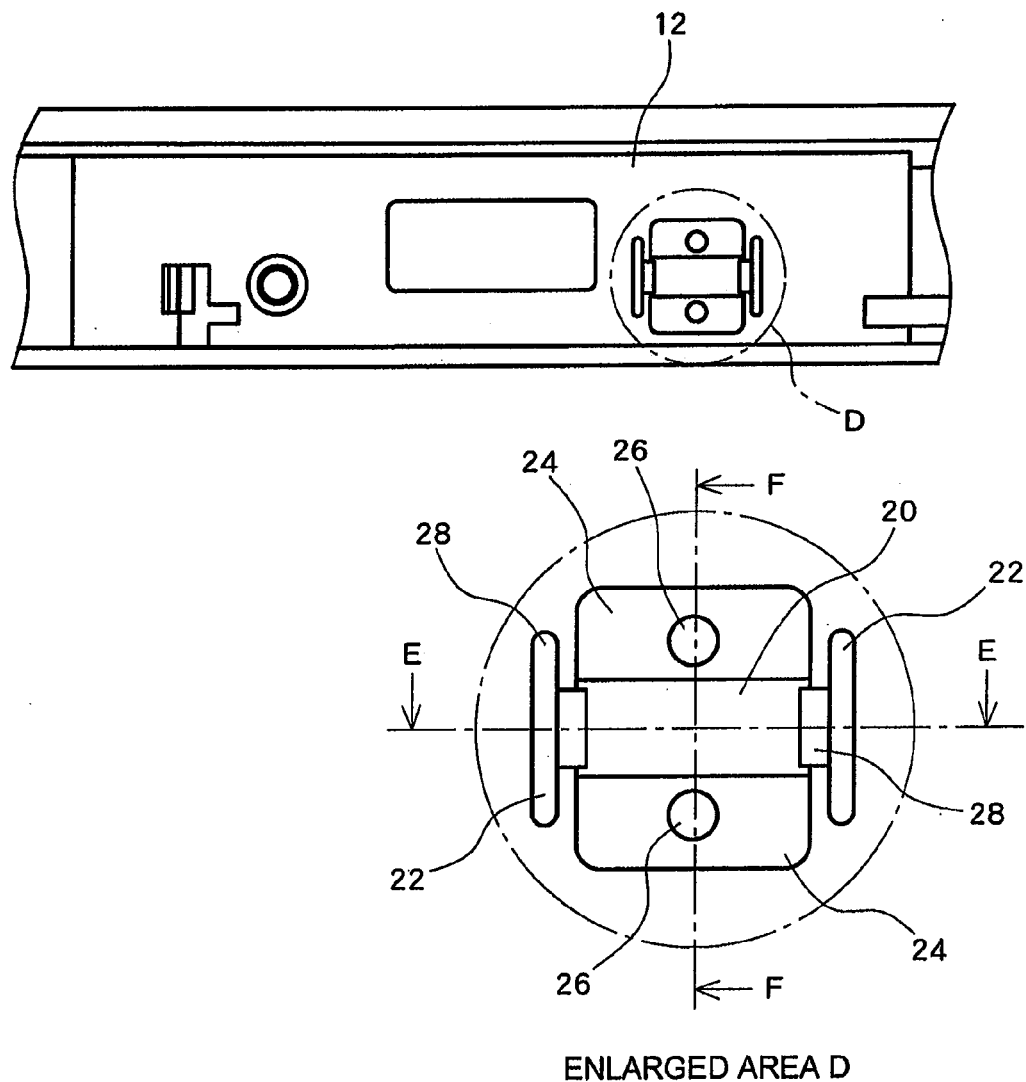
FIG. 8 is a rear view of a design panel of the other embodiment.
Figure 9A:
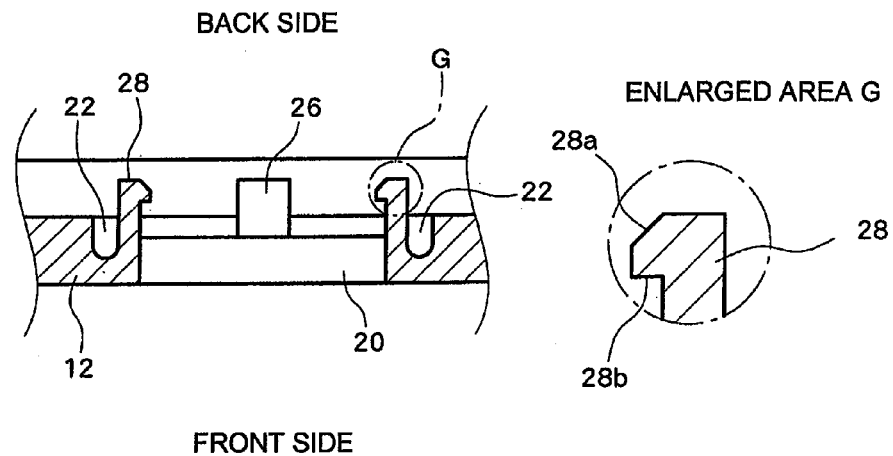
FIG. 9A is a cross-sectional view taken along line E-E shown in FIG. 8.
Figure 9B:
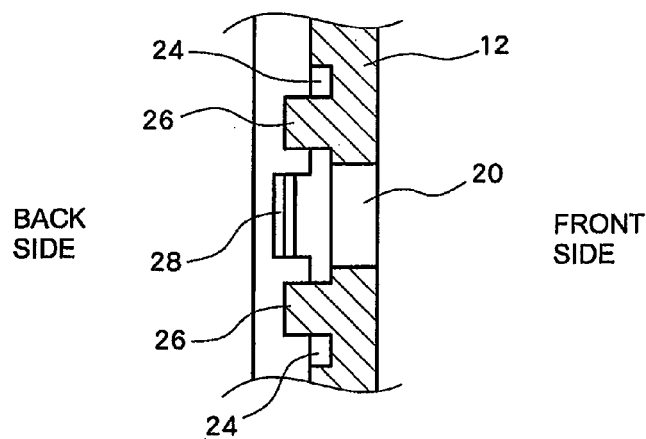
FIG. 9B is a cross-sectional view taken along line F-F shown in FIG. 8.

The design panel 12 is now described by reference to FIGS. 8, 9A, and 9B. FIG. 8 is a rear view of the design panel 12; FIG. 9A is a cross-sectional view taken along line E-E shown in FIG. 8; and FIG. 9B is a cross-sectional view taken along line F-F shown in FIG. 8.

The insert hole 20 into which the light guide lens 16 is to be inserted is opened in the design panel 12. The insert hole 20 assumes a shape commensurate with the lens 36 of the light guide lens 16; namely, a horizontally long, substantially oblong shape when viewed from the front. Unlike the lens 36, the insert hole 20 has an opening width that is constant along a thicknesswise direction of the design panel (the opening width may also be changed in correspondence with the shape of the lens 36).

The substantially rectangular indentation 24 is formed so as to extend outwardly from each of the two long sides of the insert hole 20 on the back side of the design panel 12. Each of the two indentations 24 is a region into which a corresponding one of the flanges 38 of the light guide lens 16 is to be accommodated. The indentation 24 assumes a shape commensurate with the corresponding flange 38, and a depth of the indentation 24 is slightly smaller than a thickness of the corresponding flange 38.

The positioning boss 26 stands upright around the center of each of the two indentations 24. As a result of the two positioning bosses 26 being inserted into the corresponding positioning holes 40 formed in the respective flanges 38, thereby positioning the light guide lens 16.

Projecting members 28 each of which assumes a substantially L-shaped cross-sectional profile are formed along respective short sides of the insert hole 20. The projecting members 28 are regions that allow entry of the light guide lens 16 into the insert hole 20 from its back side and that also regulate movement of the once-entered light guide lens 16 to the back side. Leading ends of the projecting members 28 protrude toward an interior side. A bottom surface 28*b* of each of the leading ends forms a flat surface that opposes the rear end face of the entered light guide lens 16. Further, an upper surface 28*a* of each of the leading ends of the projecting members 28 is tapered so as to taper down toward the interior side. A distance between the bottom surface 28*b* of each of the leading ends of the projecting members 28 and the front surface of the design panel 12 is substantially equal to the thickness of the light guide lens 16. A distance between interior ends of the two projecting members 28 is slightly smaller than the width of the light guide lens 16 measured along its major axis.

The auxiliary groove 22 extending along a short side is formed in the neighborhood of each of short sides of the insert hole 20 of the design panel 12; in other words, a neighborhood of a root of the individual projecting member 28. Each of the auxiliary grooves 22 has a depth that is about one-half of the thickness of the design panel 12 and hence becomes invisible from the front side. By virtue of presence of the auxiliary grooves 22, a significant decrease arises in rigidity of the neighborhoods of the projecting members 28, so that the projecting members 28 can be easily subjected to elastic deformation.

Figure 10B:
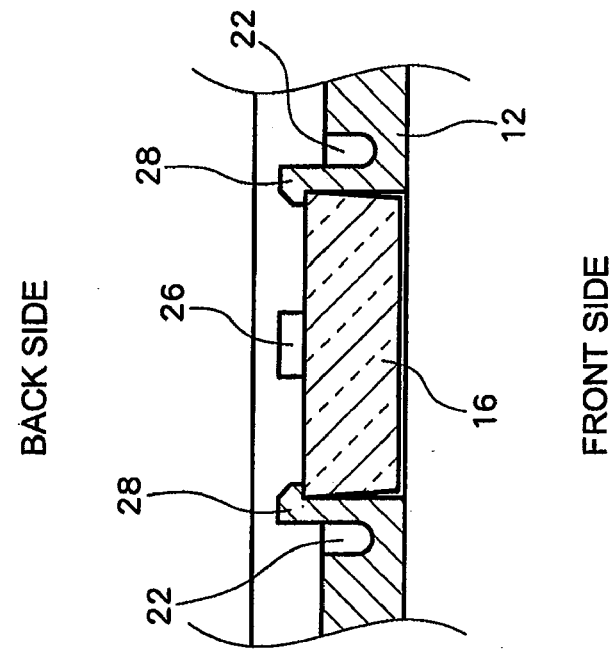
FIG. 10B is a schematic lateral cross-sectional view of the neighborhood of the light guide lens achieved before and after assembly of the lens.
Figure 10A:
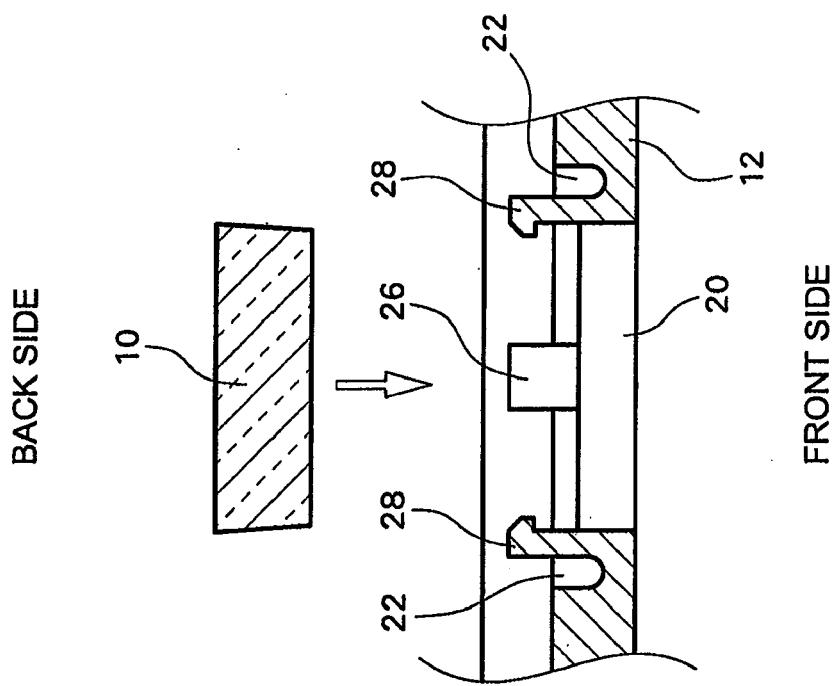
FIG. 10A is a schematic lateral cross-sectional view of a neighborhood of the light guide lens achieved before and after assembly of the lens.
Figure 11B:
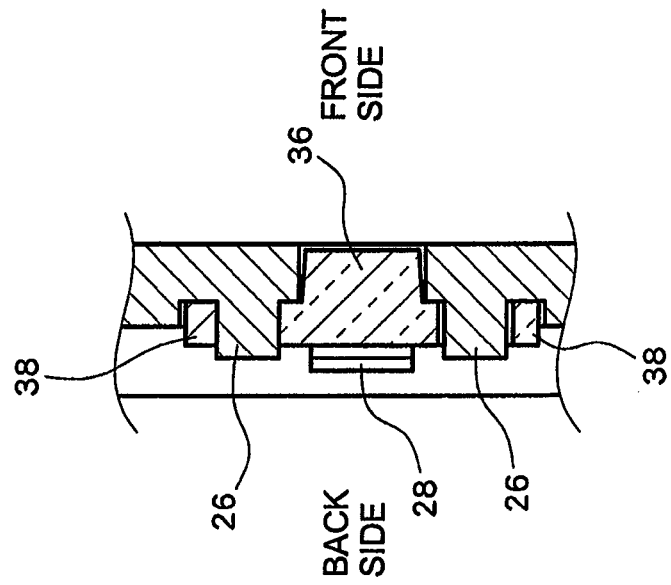
FIG. 11B is a schematic longitudinal cross-sectional view of the neighborhood of the light guide lens achieved before and after assembly of the lens.
Figure 11A:
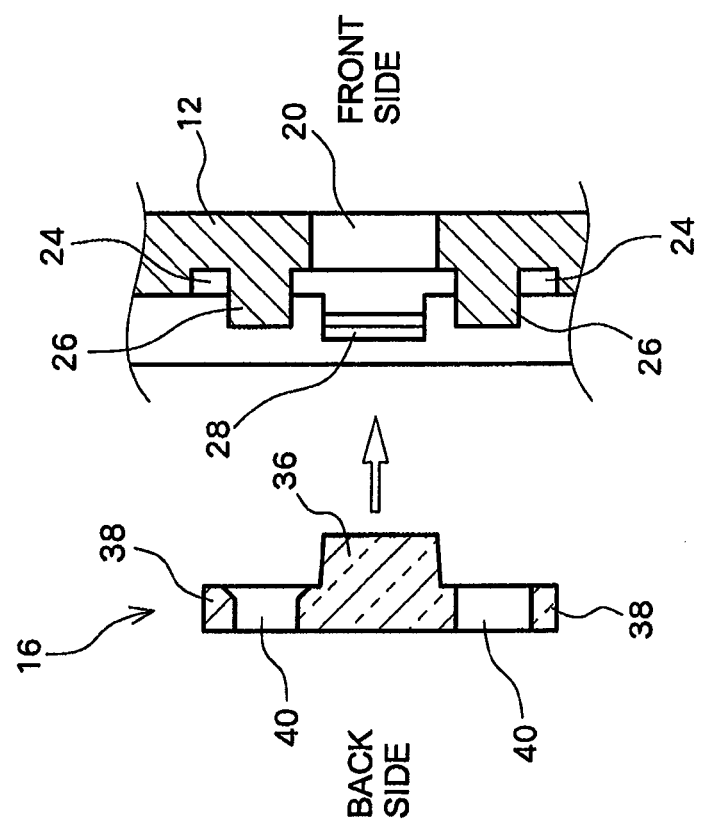
FIG. 11A is a schematic longitudinal cross-sectional view of the neighborhood of the light guide lens achieved before and after assembly of the lens.

Assembly flow for attaching the light guide lens 16 to the design panel 12 is now described by reference to FIGS. 10A, 10B, 11A, and 11B. FIGS. 10A and 10B are schematic lateral cross-sectional views of the neighborhood of the light guide lens 16 achieved before and after assembly of the lens. FIGS. 11A and 11B are schematic longitudinal cross-sectional views of the neighborhood of the light guide lens 16 achieved before and after assembly of the lens.

As mentioned above, in the present embodiment, the light guide lens 16 is inserted into the insert hole 20 from the back side when the light guide lens 16 is attached to the design panel 12. The front surface of the light guide lens 16 pressed from the back side toward the insert hole 20 first comes into contact with the tapered surfaces on upper surfaces of the leading ends of the respective projecting members 28. When the light guide lens 16 is pushed to the front side while the front surface of the light guide lens remains in contact with the tapered surfaces, the tapered surfaces convert the press force into horizontal outward force, and the thus-converted force is transmitted to the projecting members 28. Upon receipt of the horizontal outward force, the projecting members 28 become deformed outwardly. In particular, since in the present embodiment the auxiliary grooves 22 are formed in the neighborhoods of the roots of the respective projecting members 28, a significant decrease occurs in the rigidity of the neighborhoods of the projecting members 28. As a consequence, the projecting members 28 become deflected in a horizontal outward direction upon receipt of relatively small force. Passage of the light guide lens 16 is allowed by means of deflection (elastic deformation) of the projecting members 28.

The light guide lens 16 passed through the space between the two projecting members 28 further moves toward the front side. The positioning bosses 26 finely adjusts the position of the light guide lens 16 at this time in such a way that the positioning bosses are inserted into the positioning holes 40. The two positioning bosses 26 are inserted into the respective positioning holes 40, whereby the horizontal position of the light guide lens 16 is defined.

Subsequently, when the light guide lens 16 is further pushed, the front end faces of the flanges 38 finally come into contact with bottom surfaces of the indentations 24. When this state is accomplished, assembly of the light guide lens 16 is completed. The front end faces of the respective flanges 38 remain in contact with the bottom surfaces of the respective indentations 24 at a point in time when assembly operation is completed. Therefore, since further movement of the light guide lens 16 toward the front side is completely blocked, detachment of the light guide lens 16 to the front side is reliably prevented. Further, the bottom surfaces of the leading ends of the projecting members 28 remain close to the rear end face of the light guide lens 16. Therefore, when the light guide lens 16 is pushed against the back side, the rear end face of the light guide lens 16 comes into contact with the bottom surfaces of the leading ends of the projecting members 28, whereby further movement of the light guide lens 16 to the back side is regulated. As a consequence, detachment of the light guide lens 16 to the back side is also prevented thoroughly.

Specifically, in the present embodiment, detachment of the light guide lens 16 to both the front side and the back side is effectively prevented as in the first embodiment. When compared with the related art, assembly of the light guide lens 16 can be facilitated, so that component costs can be curtailed.

Further, even in the present embodiment, the once-attached light guide lens 16 can be detached. Specifically, when detachment of the light guide lens is required after the light guide lens 16 has been attached to the insert hole 20, the light guide lens 16 is pressed from the front side to the back side while the projecting members 28 are outwardly deflected by exertion of outward-oriented force, whereby the light guide lens 16 can be detached from the design panel 12. As a consequence, wasteful discarding of the light guide lens 16 and the design panel 12 can be lessened, so that manufacturing costs can be curtailed further.

Moreover, since the present embodiment employs a configuration in which the light guide lens 16 is attached from the back side, a risk of flaws being inflicted on the front surface of the design panel 12 (i.e., a surface exposed outside) during assembly operation can be significantly diminished. In normal times, in addition to the light guide lens 16, an actuation button, or the like, is also attached to the design panel 12. The actuation button, or the like, is usually attached to the design panel 12 from the backs side in many cases. In the present embodiment, when the light guide lens 16 is attached from the back side, time and effort to turn the design panel 12 upside down, which would otherwise be required during an interval between assembly of an actuation button and assembly of the light guide lens 16, become obviated, so that labor hours required for manufacture can be reduced.

The two embodiments provide descriptions by means of taking the horizontally long, substantially oblong light guide lens 16 as an example. However, the shape of the light guide lens 16 and that of the insert hole 20 can be changed, as appropriate, so long as the light guide lens 16 is attached to the insert hole 20 while the rim of the insert hole 20 is elastically deformed. For instance, the light guide lens 16 and the corresponding insert hole 20 may also be given a circular shape or a square shape when viewed from the front. However, in order to effectively elastically deform the insert hole 20, it is desirable that the insert hole 20 (by extension, the light guide lens 16) should assume a shape elongated in one direction; for instance, an oval shape or an oblong shape, when viewed in plane.

Figure 12:
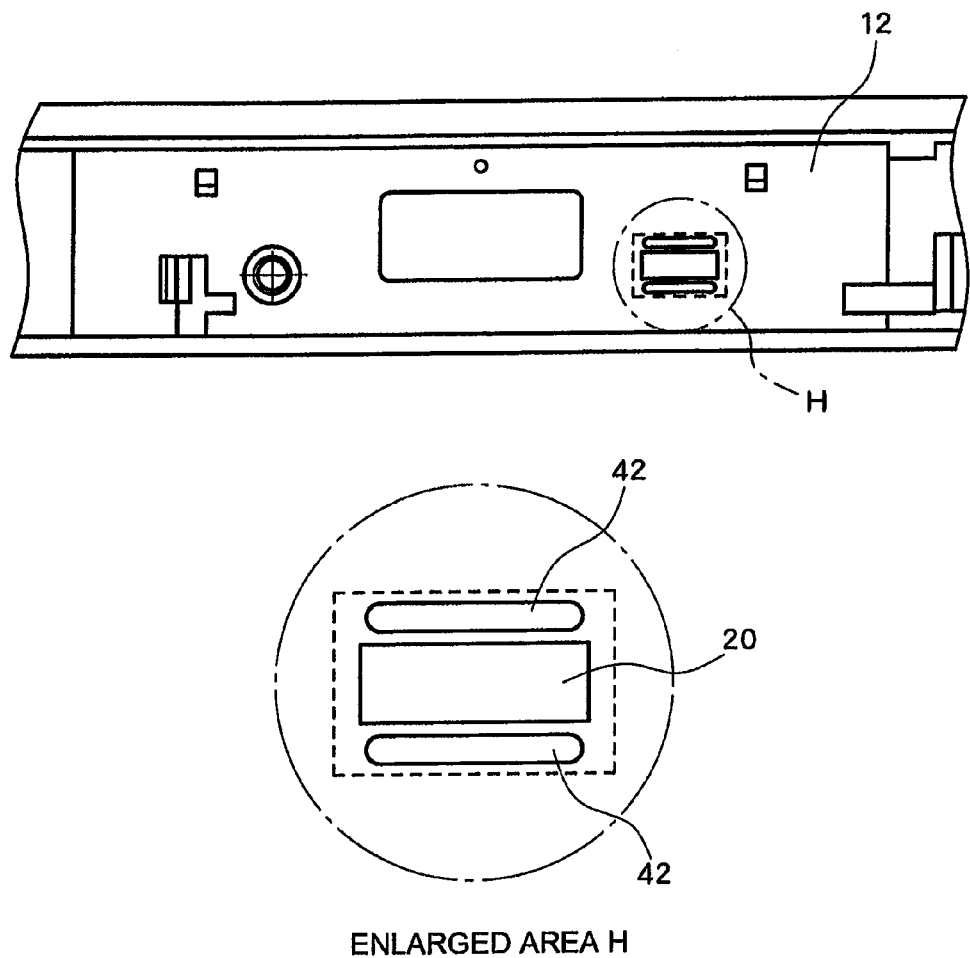
FIG. 12 is a rear view of a design panel of the other embodiment.
Figure 13:
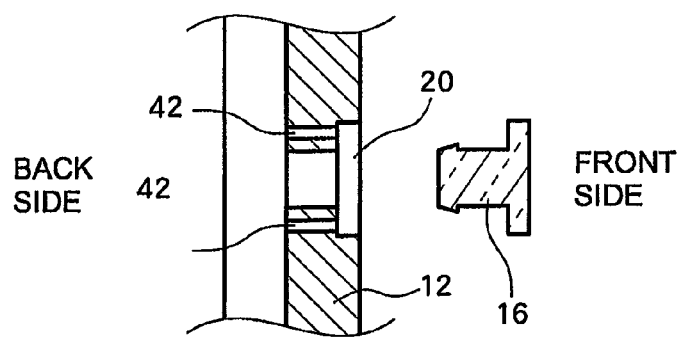
FIG. 13 is a schematic longitudinal cross-sectional view of the neighborhood of the light guide lens acquired during assembly of the lens.

In the present embodiment, in order to promote elastic deformation of the rim of the insert hole 20, the auxiliary grooves 22 are provided. However, elongated through holes can also be provided in lieu of the auxiliary grooves 22. As shown in; for instance, FIGS. 12 and 13, elongated through holes 42 extended along the long sides are provided in the neighborhoods of the long sides of the insert hole 20. In this case, in order to prevent the elongated through holes 42 from becoming visible from the front side, the light guide lens 16 is given a substantially T-shaped cross-sectional profile and has a surface of a size to cover the elongated through holes 42, and an indentation capable of accommodating the surface is previously formed in the front surface of the design panel 12. It is desirable in this case to cover and hide the elongated through holes 42 by means of the surface of the light guide lens 16 inserted from the front side. By means of such a configuration, the rim of the insert hole 20 can be elastically deformed in an effective manner, as a result of which the light guide lens 16 can be effectively assembled.

Although the embodiments exemplify the optical disc drive as an electronic device, another electronic device is naturally employed, so long as the device is an electronic device having an indicator with a light guide lens.

The invention claimed is:

1. An electronic device with an indicator comprising:
   a design panel made of a resin; and
   a light guide lens that guides to the outside light from a light source disposed in the indicator and that is to be attached to the design panel, wherein an insert hole that is a through hole whose shape is commensurate with the light guide lens is formed in the design panel; and wherein the light guide lens is inserted into the insert hole as a result of a rim of the insert hole being elastically deformed when the light guide lens is pushed into the insert hole, to thus be attached to the design panel.

2. The electronic device according to claim 1, wherein grooves or through holes that promote elastic deformation are formed along sides of the insert hole and in a neighborhood of the rim of the insert hole on a back surface of the design panel.

3. The electronic device according to claim 1, wherein the insert hole is made in such a way that an opening width of the insert hole measured on a back surface side is smaller than an opening width of the insert hole measured on a front surface side, and
   the light guide lens has a portion whose cross-sectional profile is commensurate with a cross-sectional profile of the insert hole and is press fitted into the insert hole from the front side.

4. The electronic device according to claim 3, wherein turned portions that bulge outside and that are engaged with the back surface are provided on respective portions of the light guide lens that protrude from the back surface of the design panel when the light guide lens is pushed until a front surface of the light guide lens becomes substantially flush with a front surface of the design panel.

5. The electronic device according to claim 1, further comprising projecting members that protrude from a rim on a back surface side of the insert hole, allow entry of the light guide lens from the back surface side, and oppose in close proximity to a back surface of the light guide lens entered from the back surface side, thereby preventing detachment of the light guide lens.

6. The electronic device according to claim 5, wherein the light guide lens has a lens and thin flanges that extend from an outer periphery of a back surface of the lens to an outside; and
   indentations for accommodating the flanges are formed along the rim of the insert hole on a back surface side of the design panel.

7. A lens attachment method for attaching to a design panel of an electronic device a light guide lens that guides light from a light source provided in an indicator to the outside, the method comprising:
   forming, in the design panel made of a resin, an insert hole whose shape is commensurate with the light guide lens; and
   inserting the light guide lens into the insert hole by elastically deforming a rim of the insert hole when the light guide lens is pushed into the insert hole, thereby attaching the light guide lens to the design panel.

* * * * *